US011866909B2

(12) United States Patent
Nicholson

(10) Patent No.: US 11,866,909 B2
(45) Date of Patent: Jan. 9, 2024

(54) MACHINE CONTROL COMPONENT WITH INPUT DEVICE TO CONTROL MACHINE DISPLAY

(71) Applicant: Caterpillar Inc., Peoria, IL (US)

(72) Inventor: Christian L. Nicholson, Raleigh, NC (US)

(73) Assignee: Caterpillar Inc., Peoria, IL (US)

(*) Notice: Subject to any disclaimer, the term of this patent is extended or adjusted under 35 U.S.C. 154(b) by 91 days.

(21) Appl. No.: 16/949,585

(22) Filed: Nov. 4, 2020

(65) Prior Publication Data

US 2022/0136210 A1 May 5, 2022

(51) Int. Cl.

| | |
|---|---|
| ***E02F 9/20*** | (2006.01) |
| ***G05G 9/04*** | (2006.01) |
| ***G05G 13/00*** | (2006.01) |
| ***G05G 9/047*** | (2006.01) |
| *G05G 1/06* | (2006.01) |

(52) U.S. Cl.

CPC ........... *E02F 9/2004* (2013.01); *G05G 9/047* (2013.01); *G05G 13/00* (2013.01); *G05G 1/06* (2013.01); *G05G 2009/04744* (2013.01); *G05G 2009/04774* (2013.01)

(58) Field of Classification Search

CPC ..... E02F 9/2004; E02F 9/2012; E02F 9/2087; E02F 9/225; E02F 9/26; G05G 1/04; G05G 1/06; G05G 9/047; G05G 9/04788; G05G 2009/04744; G05G 2009/04774; G05G 13/00; B64C 13/0421

See application file for complete search history.

(56) References Cited

U.S. PATENT DOCUMENTS 6,550,562 B2 * 4/2003 Brandt .................... G05G 9/047 74/471 XY
6,571,902 B2 * 6/2003 Heyne .................... A01B 63/10 180/324
6,854,554 B2 * 2/2005 Brandt .................... E02F 9/225 74/471 XY
6,932,183 B2 * 8/2005 Jeppe ........................ G05G 1/58 180/333

(Continued)

FOREIGN PATENT DOCUMENTS

EP 1353257 A1 * 10/2003 ............... G05G 1/10
EP 3115863 A2 * 1/2017 ............. G05G 9/047

(Continued)

OTHER PUBLICATIONS

Machine translation of KR 10-2014-0080771 A obtained on Mar. 23, 2022.*

(Continued)

*Primary Examiner* — Adam D Rogers
(74) *Attorney, Agent, or Firm* — Harrity & Harrity LLP

(57) ABSTRACT

A system may include a first control component comprising an input device configured to control an operation of a display device of a machine. The system may further include a second control component. The first control component (or the second control component) may be configured to control a movement of an implement of the machine. The second control component (or the first control component) may be configured to control a movement of the machine.

20 Claims, 4 Drawing Sheets

(56) References Cited

U.S. PATENT DOCUMENTS

| | | | | |
|---|---|---|---|---|
| 7,334,658 | B2 * | 2/2008 | Berg | E02F 9/2004 180/333 |
| 7,497,298 | B2 * | 3/2009 | Shearer | E02F 9/2004 180/333 |
| 7,502,674 | B2 | 3/2009 | Okude et al. | |
| 7,659,883 | B2 * | 2/2010 | Hsu | G06F 3/038 345/157 |
| 7,681,340 | B2 * | 3/2010 | Treuthardt | G05G 1/02 37/234 |
| 8,276,476 | B2 * | 10/2012 | Diccion | E02F 9/2004 180/315 |
| 8,437,920 | B2 * | 5/2013 | Hobenshield | E02F 9/26 701/50 |
| 9,169,620 | B2 | 10/2015 | Gabibulayev | |
| 9,315,103 | B2 * | 4/2016 | Yamauchi | G05G 1/62 |
| 9,322,146 | B2 * | 4/2016 | Marquette | E02F 9/2296 |
| 9,983,578 | B2 * | 5/2018 | Kandula | H04W 4/70 |
| 10,145,084 | B2 * | 12/2018 | Fredrickson | E02F 3/3414 |
| 10,202,740 | B2 * | 2/2019 | Stockhaus | E02F 3/32 |
| 10,401,176 | B2 | 9/2019 | Nackers et al. | |
| 10,606,303 | B2 * | 3/2020 | Weigand | A01B 71/02 |
| 10,774,504 | B2 * | 9/2020 | Storey | E02F 9/2012 |
| 2002/0166267 | A1 * | 11/2002 | McGugan | E02F 9/2004 37/348 |
| 2007/0209356 | A1 * | 9/2007 | Graeve | B62D 5/09 60/422 |
| 2013/0133469 | A1 | 5/2013 | Rey | |
| 2015/0101440 | A1 * | 4/2015 | Bonneau | G05G 9/04788 74/484 R |
| 2018/0373275 | A1 | 12/2018 | Beschorner et al. | |
| 2019/0179427 | A1 | 6/2019 | Mayer | |
| 2020/0012309 | A1 * | 1/2020 | Wuisan | G05G 9/047 |
| 2020/0081478 | A1 * | 3/2020 | Collins | G05G 9/04788 |
| 2020/0256035 | A1 * | 8/2020 | Moloney | G05G 9/04788 |
| 2021/0318713 | A1 * | 10/2021 | Case | G05G 9/047 |
| 2021/0355655 | A1 * | 11/2021 | Nakayama | E02F 9/2004 |
| 2022/0113754 | A1 * | 4/2022 | Beneventi | H01F 7/081 |
| 2022/0341127 | A1 * | 10/2022 | Mortensen | B62D 55/00 |

FOREIGN PATENT DOCUMENTS

| | | | | |
|---|---|---|---|---|
| GB | 2570184 A | | 7/2019 | |
| JP | 2004346643 A | | 12/2004 | |
| JP | 05030083 A | | 3/2008 | |
| KR | 20100030444 A | | 3/2010 | |
| KR | 20140080771 A | | 7/2014 | |
| WO | WO-2009048364 A1 | * | 4/2009 | E02F 9/2004 |
| WO | WO-2014189455 A1 | * | 11/2014 | G05G 1/58 |

OTHER PUBLICATIONS

Machine translation of EP 3115863 A2 obtained on Jun. 7, 2023.*

Written Opinion and International Search Report for Int'l. Patent Appln. No. PCT/US2021/056775, dated Feb. 18, 2022 (11 pgs).

* cited by examiner

MACHINE CONTROL COMPONENT WITH INPUT DEVICE TO CONTROL MACHINE DISPLAY

TECHNICAL FIELD

The present disclosure relates generally to controlling a machine and, for example, to controlling a display device of a machine.

BACKGROUND

A machine, such as a skid steer loader, may perform different tasks (e.g., at a work site) using an implement. For example, the machine may perform an earth moving task, a snow moving task, and/or another material moving task. The machine may include joysticks (e.g., two joysticks) for controlling the machine to perform the different tasks. In this regard, an operator may use the joysticks concurrently to control the machine to perform the different tasks. In other words, the operator may use both hands to operate the joysticks to control the machine to perform the different tasks.

In some instances, the machine may include a display device. The display device may include integrated controls (e.g., buttons) to control operation of the display device. Spatial constraints in an operator cabin of the machine may preclude one or more external controls (for the display device) from being included in the operator cabin. At best, any external control (e.g., a jog dial) for the display device may be limited to a vertical surface inside the operator cabin.

Before operating the display device, the operator may cause the machine to suspend performing a task and to be stationary to enable the operator to remove one hand from one of the joysticks to operate the display device (e.g., to operate the display device using the integrated controls and/or any external controls if included in the operator cabin). The operator may cause the machine to resume performing the task after operating the display device. Causing the machine to suspend and resume performing a task in such a manner may negatively affect productivity at the work site and/or may negatively affect a durability of the machine.

United Kingdom Patent Application Publication No. 2570184 (the '184 patent publication) discloses a device for controlling a working machine that comprises a display controller unit which can be activated to, at least partially, take over the operating functions of at least one electric input device (e.g., joysticks, pedals, levers, or steering wheels) with respect to at least one actuator of the working machine. The '184 patent publication also discloses that the display controller unit may be activated, and the at least one electric input deactivated, upon detection of a malfunction of the at least one electric input or the at least one actuator by a sensor system. The '184 patent publication further discloses that the display controller unit may further feature a touchscreen.

While the '184 patent publication discloses a display controller unit that may feature a touchscreen, the '184 patent publication does not address the issues relating to causing a machine to suspend and resume performing a task in order to operate a display device, as described above.

The machine control component of the present disclosure solves one or more of the problems set forth above and/or other problems in the art.

SUMMARY

In some implementations, a machine includes an implement; a display device; a first control component comprising: an input device configured to control an operation of the display device; and a second control component, wherein one of the first control component or the second control component is configured to control a first movement of the implement and/or the machine, and wherein another one of the first control component or the second control component is configured to control a second movement of the implement and/or the machine.

In some implementations, a control component of a machine includes a first input device configured to control operation of a display device of the machine; and a second input device configured to control an operation of the machine, wherein the first input device is configured to control the operation of the display device concurrently with the control component controlling the operation of the machine, wherein, when controlling the operation of the machine, the controller component is configured to control at least one of an operation of an implement of the machine or an operation of ground engaging members of the machine.

In some implementations, a system includes a first control component comprising: an input device configured to control an operation of a display device of a machine; and a second control component, wherein one of the first control component or the second control component is configured to control a movement of an implement of the machine, and wherein another one of the first control component or the second control component is configured to control a movement of the machine.

DETAILED DESCRIPTION

This disclosure relates to a machine control component that controls an operation of a display device of a machine concurrently with an operation of the machine (e.g., an operation of an implement of the machine and/or a movement of the machine) controlled by the machine control component, another machine control component of the machine, and/or one or more other input devices of the machine. The term "machine" may refer to a machine that performs an operation associated with an industry such as, for example, mining, construction, farming, transportation, or another industry. Moreover, one or more implements may be connected to the machine.

Figure 1:
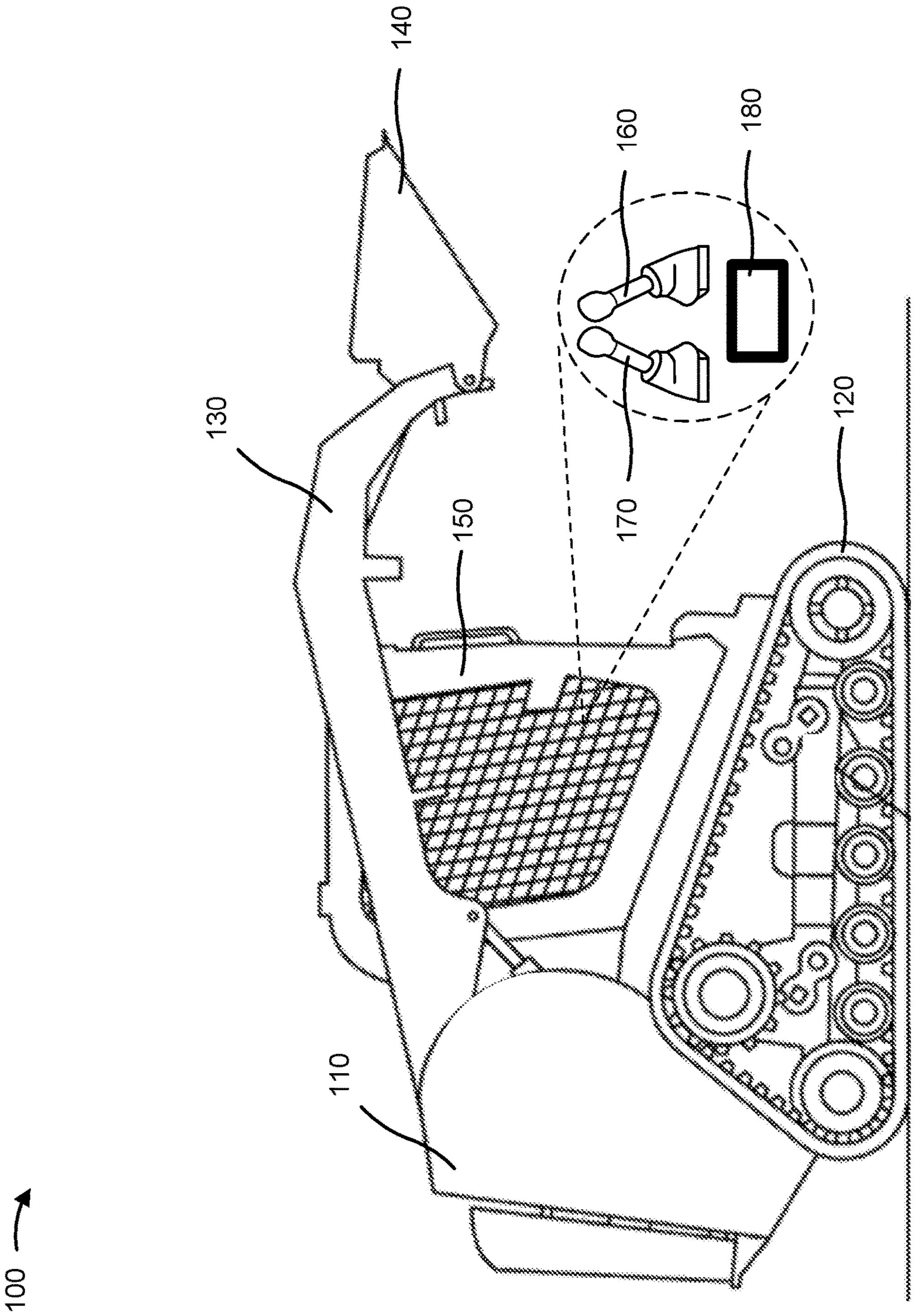
FIG. 1 is a diagram of an example machine described herein.

FIG. 1 is a diagram of an example machine 100 described herein. As shown in FIG. 1, machine 100 is embodied as a material moving machine, such as a skid steer loader. Alternatively, machine 100 may be another type of material moving machine such as a dozer, a track-type tractor, a wheel loader, a multi-terrain loader (MTL), a compact track loader (CTL), a compact wheel loader (CWL), and/or a similar machine.

As shown in FIG. 1, machine 100 includes a machine body 110, ground engaging members 120, lift arms 130, an implement 140, and an operator cabin 150. Ground engaging members 120 may be mounted on machine body 110 and are driven by one or more engines and drive trains (not shown). Ground engaging members 120 may be configured to propel machine 100. As shown in FIG. 1, ground engaging members 120 includes tracks. Alternatively, ground engaging members 120 may include wheels, rollers, and/or similar members.

Lift arms 130 may be mounted on machine body 110 and configured to raise and lower implement 140. Implement 140 may be mounted on distal ends of lift arms 130. As shown in FIG. 1, implement 140 includes a bucket. Alternatively, implement 140 may include a snow blower, loader, and/or another type of implement. In some examples, implement 140 may be operated using one or more hydraulic controls.

Operator cabin 150 is supported by machine body 110. In some implementations, a volume of the operator cabin 150 may be approximately forty cubit feet. In this regard, the volume of the operator cabin 150 may be approximately forty to forty three percent of an average volume of an interior of a standard vehicle and/or truck.

As shown in FIG. 1, operator cabin 150 includes a machine control component 160 (e.g., a first machine control component), a machine control component 170 (e.g., a second machine control component), and a display device 180. Machine control component 160 may include one or more input elements to generate signals that control an operation of display device 180 concurrently with controlling a movement of machine 100 and/or a movement of implement 140, as described in more detail below in connection with FIG. 2. Machine control component 160 may include a joystick, a lever, and/or a similar type of control component.

Machine control component 170 may include one or more input elements to generate signals that control a movement of machine 100 and/or a movement of implement 140. In some examples, unlike machine control component 160, machine control component 170 does not include one or more input elements to generate signals that control an operation of display device 180. In some implementations, in addition to machine control component 160, machine control component 170 also includes one or more input elements to generate signals that control an operation of display device 180. Machine control component 170 may include a joystick, a lever, and/or a similar type of control component.

Display device 180 may include a liquid crystal display (LCD), a light-emitting diode (LED) display, or another type of display capable of outputting graphical and/or textual information (e.g., information regarding machine 100 and/or information regarding an environment associated with machine 100). The information regarding machine 100 may include information identifying gauges of machine 100 (e.g., fuel gauge, oil gauge, engine temperature gauge, and/or another gauge). The information regarding the environment associated with machine 100 may include images and/or a video feed of a rearview of machine 100, images and/or a video feed of side views of machine 100, images and/or a video feed of a forward view of machine 100, and/or images and/or a video feed of an area surrounding machine 100.

As indicated above, FIG. 1 is provided as an example. Other examples may differ from what was described in connection with FIG. 1.

Figure 2:
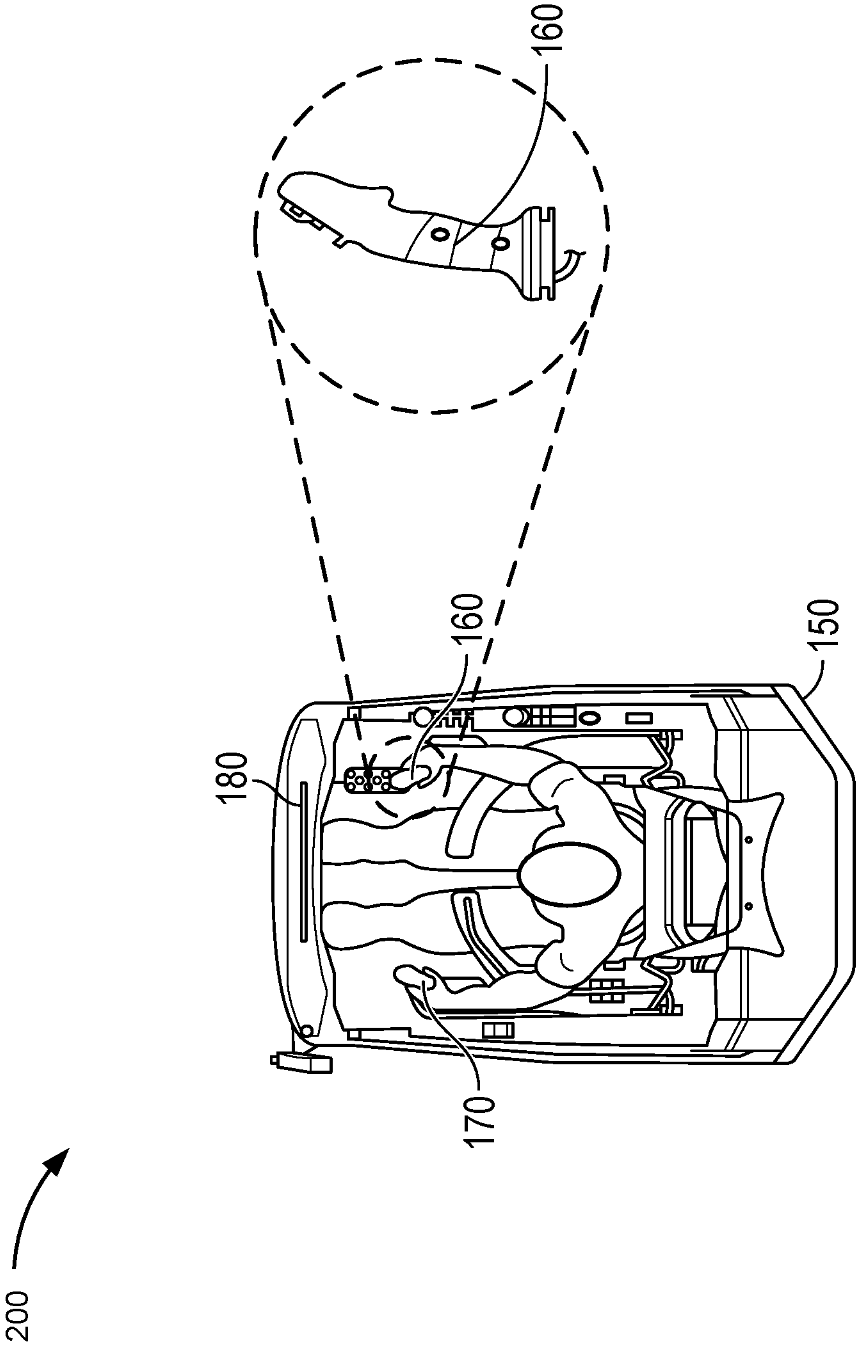
FIG. 2 is a diagram of a top view of operator cabin of FIG. 1 described herein.

FIG. 2 is a diagram of a top view 200 of operator cabin 150 of FIG. 1 described herein. As shown in FIG. 2, an operator may control operation of machine 100 using machine control component 160 and machine control component 170. In some instances, the operator may control operation of machine 100 using machine control component 160 concurrently with using machine control component 170.

In some implementations, machine control component 160 may control a movement of implement 140 and machine control component 170 may control a movement of machine 100. For example, machine control component 160 may include hydraulic controls for controlling implement 140 (as explained in more detail below in connection with FIG. 3) and machine control component 170 may include controls for controlling ground engaging members 120. For instance, the operator may control a movement of implement 140 by interacting with machine control component 160 using a right hand while concurrently controlling a movement of machine 100 by interacting with machine control component 170 using a left hand.

In some implementations, machine control component 160 may control a movement of machine 100 and machine control component 170 may control a movement of implement 140. For example, machine control component 160 may include controls for controlling ground engaging members 120 and machine control component 170 may include hydraulic controls for controlling implement 140. For instance, the operator may control a movement of machine 100 by interacting with machine control component 160 using the right hand while concurrently controlling a movement of implement 140 by interacting with machine control component 170 using the left hand.

In some implementations, machine control component 160 may control a movement of machine 100 and/or may control a movement of implement 140, and machine control component 170 may control a movement of machine 100 and/or may control a movement of implement 140. For example, machine control component 160 may include controls for controlling ground engaging members 120 and/or may include hydraulic controls for controlling implement 140. Similarly, machine control component 170 may include controls for controlling ground engaging members 120 and/or may include hydraulic controls for controlling implement 140. For instance, the operator may control a movement of machine 100 and/or implement 140 by interacting with machine control component 160 using the right hand while concurrently controlling a movement of machine 100 and/or implement 140 by interacting with machine control component 170 using the left hand.

With respect to controlling the movement of machine 100, a forward movement of machine control component 160 or machine control component 170 may cause machine 100 to move in a forward direction, and a backward movement of machine control component 160 or machine control component 170 may cause machine 100 to move in a backward direction. With respect to controlling the movement of implement 140, a forward movement of machine control component 160 or machine control component 170 may cause implement 140 to move in a forward or upward direction, and a backward movement of machine control component 160 or machine control component 170 may cause implement 140 to move in a backward (or reverse) or downward direction.

In some implementations, machine control component 160 may be configured to control a movement of a first portion of ground engaging members 120 and machine control component 170 may be configured to control a movement of a second portion of ground engaging members 120. For example, machine control component 160 may include controls for controlling the first portion of ground engaging members 120 and machine control component 170 may include controls for controlling the second portion of ground engaging members 120. For instance, machine control component 160 may be configured to control a movement of the right portion of ground engaging members 120 (e.g., right tracks and/or wheels) and machine control component 170 may be configured to control a movement of the left portion of ground engaging members 120 (e.g., left tracks and/or wheels).

The operator may control the movement of the right portion of ground engaging members 120 by interacting with machine control component 160 using the right hand while concurrently controlling the movement of the left portion of ground engaging members 120 by interacting with machine control component 170 using the left hand. With respect to controlling the movement of the right portion of ground engaging members 120, a forward movement of machine control component 160 may cause the right portion of ground engaging members 120 to move in a forward direction. A backward movement of machine control component 160 may cause the right portion of ground engaging members 120 to move in a backward direction. With respect to controlling the movement of the left portion of ground engaging members 120, a forward movement of machine control component 170 may cause the left portion of ground engaging members 120 to move in a forward direction. A backward movement of machine control component 170 may cause the left portion of ground engaging members 120 to move in a backward direction.

Additionally, or alternatively, to machine control component 160 controlling the movement of the first portion of ground engaging members 120 and machine control component 170 controlling the movement of the second portion of ground engaging members 120, machine control component 160 may control a forward movement and a backward movement of implement 140 and machine control component 170 may control lateral movements of implement 140. For example, machine control component 160 may include hydraulic controls for controlling the forward movement and the backward movement of implement 140 and machine control component 170 may include hydraulic controls for controlling the lateral movements of implement 140.

Additionally, or alternatively, to machine control component 160 controlling the movement of the first portion of ground engaging members 120 and machine control component 170 controlling the movement of the second portion of ground engaging members 120, machine control component 160 may control the lateral movements of implement 140 and machine control component 170 may control the forward movement and the backward movement of implement 140. For example, machine control component 160 may include hydraulic controls for controlling the lateral movements of implement 140 and machine control component 170 may include hydraulic controls for controlling of the forward movement and the backward movement of implement 140.

With respect to controlling the forward movement and the backward movement of implement 140, a forward movement of machine control component 160 or machine control component 170 may cause implement 140 to move in a forward or upward direction. A backward movement of machine control component 160 or machine control component 170 may cause implement 140 to move in a backward or downward direction. With respect to controlling the lateral movements of implement 140, lateral movements of machine control component 160 or machine control component 170 may cause corresponding lateral movements of implement 140.

Machine control component 160 may be configured to control an operation of display device 180 concurrently with the controlled movements of machine 100 and/or implement 140 described above.

As indicated above, FIG. 2 is provided as an example. Other examples may differ from what was described in connection with FIG. 2.

Figure 3:
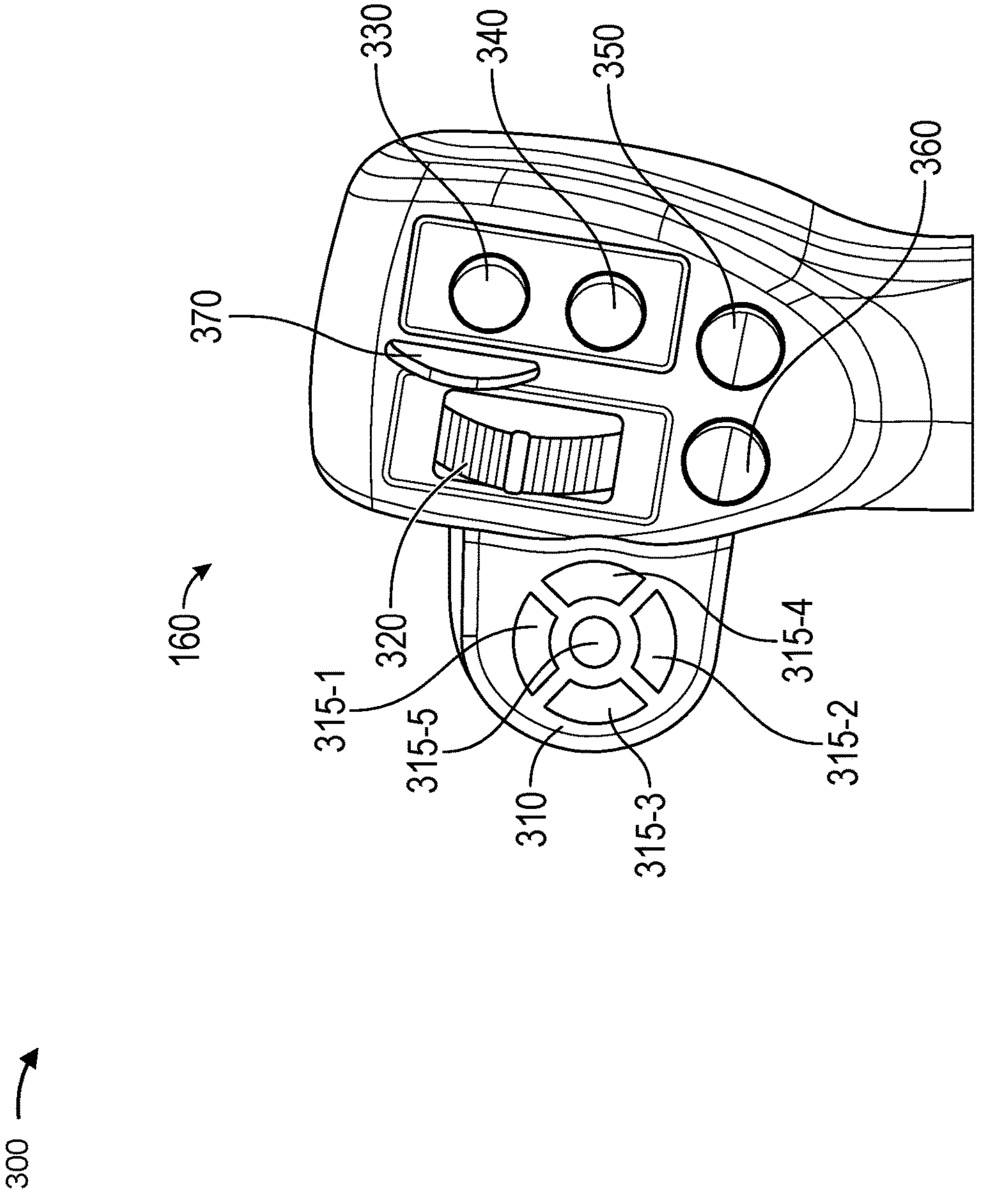
FIG. 3 is a diagram of an example implementation described herein.

FIG. 3 is a diagram of an example implementation 300 described herein. Example implementation 300 is an example implementation of machine control component 160 of operator cabin 150 of FIG. 2. The description below could equally apply to machine control component 170 (rather than machine control component 160) or to both machine control component 160 and machine control component 170.

As shown in FIG. 3, machine control component 160 may include a first input device 310, a second input device 320, a third input device 330, a fourth input device 340, a fifth input device 350, a sixth input device 360, and a divider 370. In some examples, machine control component 160 may have a different look and feel and/or include a greater number or a lesser number of input devices.

First input device 310 may include input elements 315 (e.g., input elements 315-1 to 315-5). Input elements 315 may include buttons, switches, and/or other types of input elements. The operator may use input element(s) 315 of first input device 310 to control the operation of display device 180 while concurrently using machine control component 170, machine control component 160, and/or one or more other input devices (e.g., second input device 320, third input device 330, fourth input device 340, fifth input device 350, and/or sixth input device 360) to control movement of machine 100 and/or an operation of implement 140. For example, while moving machine control component 160 with a right hand of the operator to control an operation of machine 100 or implement 140, the operator may control the operation of display device 180 by interacting with input element(s) 315 using a right thumb of the operator.

For instance, while moving machine control component 160 with a right hand of the operator to control an operation of machine 100 or implement 140, the operator may use the right hand to operate input element 315-1 to navigate up on display device 180, input element 315-2 to navigate down on display device 180, input element 315-3 to navigate left on display device 180, input element 315-4 to navigate right on display device 180, and input element 315-5 to select an item provided on display device 180. Input elements 315 of first input device 310 may be configured to be used to control the operation of display device 180 concurrently with machine control component 160, machine control component 170, and/or one or more other input devices (e.g., second input device 320, third input device 330, fourth input device 340, fifth input device 350, and/or sixth input device 360) being used to control movement of machine 100 and/or movement of implement 140.

Input elements 315 may enable the operator to navigate different screens (e.g., graphical user interfaces) provided by display device 180 (e.g., navigate screens on a same hierarchical level and/or on different hierarchical levels) and navigate items provided by the screens. In this regard, input elements 315 may enable the operator to navigate and select potentially hundreds of items provided by the screens.

In some examples, the screens may include a first screen to select a camera view (e.g., rearview, side view, front view, and/or 360 view), a second screen to provide information regarding different gauges of machine 100 (e.g., fuel gauge, oil gauge, and/or temperature gauge), a third screen to adjust settings of machine 100, a fourth screen to adjust settings of display device 180 (e.g., adjust brightness and/or contrast), a fifth screen to adjust settings of an audio output (e.g., select an audio source, adjust or mute a volume, select a channel, and/or scan channels), a sixth screen to provide information regarding machine 100 (e.g., a type, a model, machine hours, and/or similar information regarding machine 100), a seventh screen to provide information regarding maintenance and servicing of machine 100, an eighth screen to provide information regarding wireless connectivity, and/or a ninth screen to provide information regarding one or more operators of machine 100 (e.g., operator name, operator settings, and/or information regarding operator productivity).

Based on the foregoing, first input device 310 may enable complex operation of display device 180 (e.g., navigating different screens at different levels in order to navigate and select potentially hundreds of items) while machine control component 160, machine control component 170, and/or one or more other input devices (e.g., second input device 320, third input device 330, fourth input device 340, fifth input device 350, and/or sixth input device 360) is/are concurrently used to control movement of machine 100 and/or movement of implement 140.

Second input device 320 may be configured to control an operation of implement 140 (or may be configured to control a movement of machine 100). As shown in FIG. 3, second input device 320 may be implemented as a scrolling input element. As an example, scrolling second input device 320 in a first direction may cause a movement of implement 140 in a first direction. For instance, scrolling second input device 320 in an upward direction may cause a movement of implement 140 in a forward or upward direction. Continuing with this example, scrolling second input device 320 in a second direction may cause a movement of implement 140 in a second direction. For instance, scrolling second input device 320 in a downward direction may cause a movement of implement 140 in a reverse or downward direction.

In some examples, third input device 330, fourth input device 340, fifth input device 350, and sixth input device 360 may be configured to control an operation of machine 100. For example, third input device 330 may cause machine 100 to move in a forward direction, fourth input device 340 may cause machine 100 to move in a backward direction, fifth input device 350 may cause a speed of machine 100 to increase, and sixth input device 360 may cause a speed of machine 100 to decrease.

In some examples, third input device 330, fourth input device 340, fifth input device 350, and sixth input device 360 may be configured to control an operation of implement 140. For example, third input device 330 may cause a movement of implement 140 in a forward or upward direction, fourth input device 340 may cause a movement of implement 140 in a reverse or downward direction, fifth input device 350 may cause a lateral movement of implement 140 in a first direction, and sixth input device 360 may cause a lateral movement of implement 140 in a second direction (opposite the first direction).

In some examples, third input device 330, fourth input device 340, fifth input device 350, and sixth input device 360 may be used in connection with different implements that may replace implement 140 mounted on lift arms 130 and/or that may be connected to machine 100 in addition to implement 140. For example, third input device 330 may be used to adjust a configuration of machine 100 to operate a second implement when the second implement replaces implement 140 and/or when the second implement is connected to machine 100, fourth input device 340 may be used to adjust a configuration of machine 100 to operate a third implement when the third implement replaces implement 140 and/or when the third implement is connected to machine 100, and so on.

In some implementations, first input device 310, second input device 320, third input device 330, fourth input device 340, fifth input device 350, and/or sixth input device 360 may be configurable (e.g., programmable) to cause machine 100, implement 140, or display 180 to perform an action. For example, first input device 310, second input device 320, third input device 330, fourth input device 340, fifth input device 350, and/or sixth input device 360 may be programmed to cause machine 100, implement 140, and/or display 180 to perform any one or more of the actions described above, such as any one or more of the actions described above in connection with first input device 310, second input device 320, third input device 330, fourth input device 340, fifth input device 350, and/or sixth input device 360.

As indicated above, FIG. 3 is provided as an example. Other examples may differ from what was described in connection with FIG. 3. For example, in some implementations, first input device 310 and input elements 315 may be provided on machine control component 170 (instead of machine control component 160). Alternatively, a first portion of input elements 315 may be provided on machine control component 160 and a second portion of input elements 315 may be provided on machine control component 170. For example, input elements 315-1 to 315-4 may be provided on machine control component 160 and input element 315-5 may be provided on machine control component 170, or vice versa.

Figure 4:
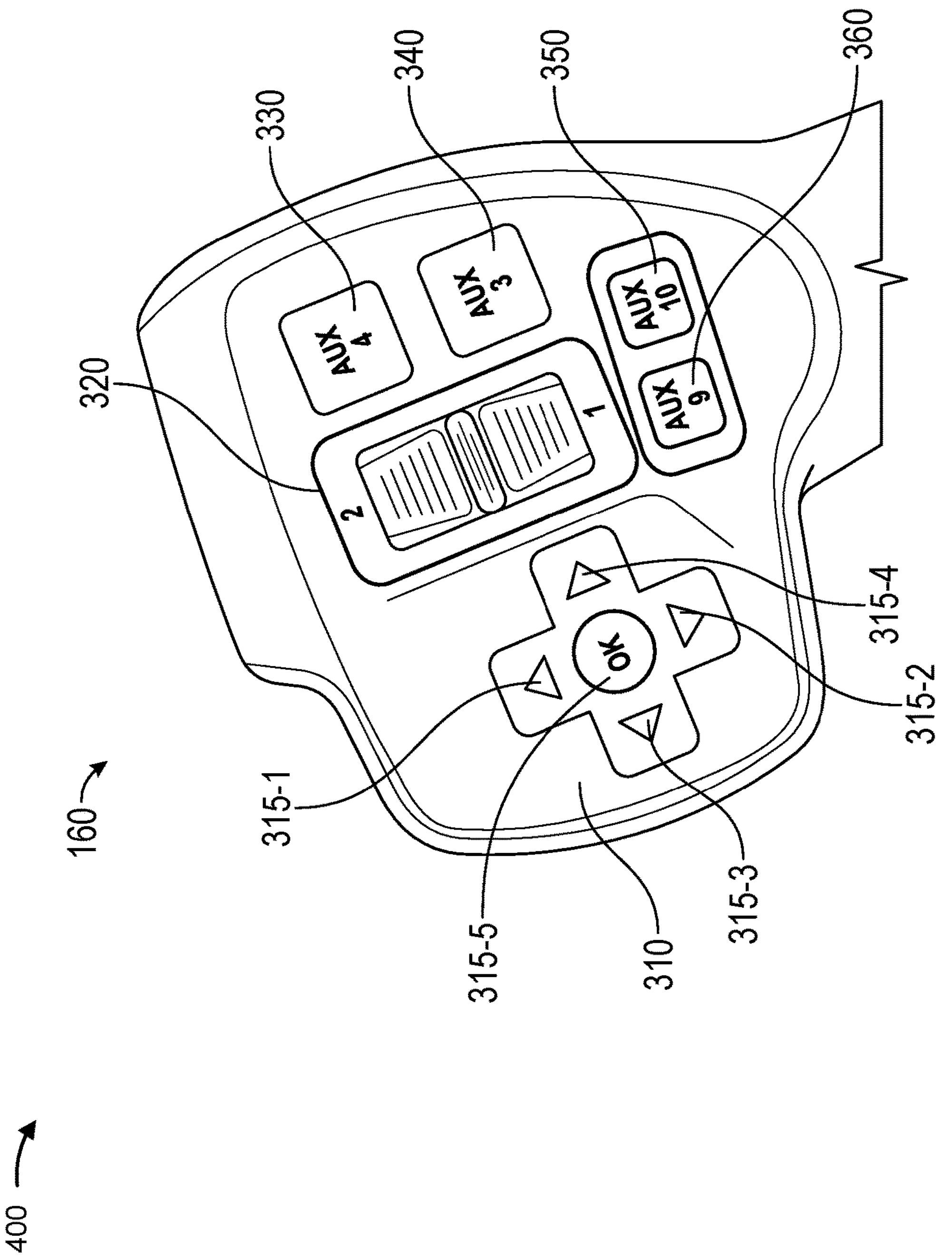
FIG. 4 is a diagram of an example implementation described herein.

FIG. 4 is a diagram of an example implementation 400 described herein. Example implementation 400 is another example implementation of machine control component 160 of operator cabin 150 of FIG. 2. The elements of machine control component 160 have been described above with respect to FIG. 3.

Machine control component 160 of FIG. 4 has a different look and feel than machine control component 160 of FIG. 3. For example, first input device 310, second input device 320, third input device 330, fourth input device 340, fifth input device 350, and sixth input device 360 have a different look and feel. Nevertheless, first input device 310, second input device 320, third input device 330, fourth input device 340, fifth input device 350, and/or sixth input device 360 may operate similarly to first input device 310, second input device 320, third input device 330, fourth input device 340, fifth input device 350, and/or sixth input device 360 of FIG. 3.

As indicated above, FIG. 4 is provided as an example. Other examples may differ from what was described in connection with FIG. 4.

INDUSTRIAL APPLICABILITY

This disclosure relates to a machine control component that controls an operation of a display device of a machine concurrently with the disclosed machine control component controlling an operation of the machine (e.g., an operation of an implement of the machine and/or a movement of the machine). The disclosed machine control component may prevent an operator from causing the machine to suspend a task performed by the machine in order to control an operation of the display device and cause the machine to resume performing the task after controlling the operation of the display device. Additionally, the disclosed machine control component may enable the operator to control an operation of the display device while using the disclosed machine control component to control an operation of the machine and/or the implement (e.g., controlling the operation of the display device without the operator removing a hand from the disclosed machine control component). Causing the machine to suspend and resume performing a task in such a manner may waste machine resources and/or computing resources that are used to cause the machine to suspend performing the task and machine resources and/or computing resources that are used to cause the machine to resume performing the task.

Several advantages may be associated with the disclosed machine control component. For example, the disclosed machine control component may enable the operator to control an operation of the display device concurrently with the disclosed machine control component controlling an operation of the implement of the machine and/or controlling a movement of the machine.

Additionally, or alternatively, the disclosed machine control component may enable the operator to control an operation of the display device concurrently with the operator controlling an operation of the machine or the implement using another machine control component (of the machine) and/or one or more input devices of the disclosed machine control component. Accordingly, the disclosed machine control component may preserve machine resources and/or computing resources that would have otherwise been used to cause the machine to suspend performing the task and resume performing the task.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A machine, comprising:

an implement;

a display device;

a first control component comprising:

a first portion comprising a first input device configured to control an operation of the display device, and a second portion comprising a second input device, a third input device, a fourth input device, a fifth input device, a sixth input device, and a divider, wherein a top of the first portion is below a top of the second portion, wherein the first input device includes a plurality of input elements, wherein a first input element of the plurality of input elements is provided between a second input element and a third input element of the plurality of input elements and provided between a fourth input element and a fifth input element of the plurality of input elements, wherein the third input device and the fourth input device are located adjacent to a first lateral side of the second input device, wherein the first input device is located adjacent to a second lateral side of the second input device that is opposite the first lateral side, wherein the second input device is a vertically oriented scrolling input element located between the first input device and the third input device, wherein the second input device and the sixth input device are located on a first side of the divider, wherein the third input device, the fourth input device, and the fifth input device are located on a second side of the divider, wherein the divider is between a portion of the vertically oriented scrolling input element and the third input device, and wherein the divider is above the fourth input device and the fifth input device; and a second control component, wherein one of the first control component or the second control component is configured to control a first movement of the implement and/or the machine, and wherein another one of the first control component or the second control component is configured to control a second movement of the implement and/or the machine.

2. The machine of claim 1, wherein the first input device is configured to control the operation of the display device concurrently with the first control component or the second control component controlling the first movement of the implement and/or the machine or concurrently with the first control component or the second control component controlling the second movement of the implement and/or the machine, wherein the fourth input device is located below the third input device, wherein the fifth input device is located below the fourth input device, wherein the sixth input device is located below the second input device, and wherein the sixth input device is located between the first input device and the fifth input device.

3. The machine of claim 1, wherein the plurality of input elements are configured to control the operation of the display device concurrently with the first control component or the second control component controlling the first movement of the implement and/or the machine or concurrently with the first control component or the second control component controlling the second movement of the implement and/or the machine;

wherein the second input device is configured to control the first movement of the implement without controlling the first movement of the machine;

wherein the fourth input device is located below the third input device;

wherein the fifth input device is located below the fourth input device; and wherein the second control component is configured to control the second movement of the machine without controlling the second movement of the implement.

4. The machine of claim 1, further comprising ground engaging members;

wherein the first control component is configured to control the first movement of the machine; and wherein, when controlling the first movement of the machine, the first control component is configured to control a movement of the ground engaging members.

5. The machine of claim 1, further comprising ground engaging members;

wherein the first control component is configured to control a movement of a first portion of the ground engaging members; and wherein the second control component is configured to control a movement of a second portion of the ground engaging members.

6. The machine of claim 5, wherein the first input device is configured to control the operation of the display device while at least one of:

the first control component controls the movement of the first portion of the ground engaging members, or the second control component controls the movement of the second portion of the ground engaging members.

7. The machine of claim 1, wherein the first control component includes a first joystick; and wherein the second control component includes a second joystick.

8. The machine of claim 1, wherein the fourth input device is vertically between the divider and the fifth input device, wherein the divider is above a portion of a vertically movable portion of the vertically oriented scrolling input element, and wherein the divider is horizontally between the first portion of the vertically oriented scrolling input element and an entirety of the third input device.

9. A control component, the control component comprising:

a first input device, wherein the first input device includes a plurality of input elements, and wherein a first input element of the plurality of input elements is provided between a second input element and a third input element of the plurality of input elements and provided between a fourth input element and a fifth input element of the plurality of input elements;

a second input device;

a third input device located adjacent to a first lateral side of the second input device;

a divider; and a fourth input device located adjacent to the first lateral side of the second input device, wherein the second input device is a vertically oriented scrolling input element located between the first input device and the third input device, wherein the second input device is located on a first side of the divider, wherein the third input device and the fourth input device are located on a second side of the divider, wherein the divider is between a first portion of the vertically oriented scrolling input element and the third input device, wherein a second portion of the vertically oriented scrolling input element extends below the divider, wherein the fourth input device is located below the third input device, wherein the first input device is located adjacent to a second lateral side of the second input device opposite the first lateral side, and wherein a top of the first input device is below a top of a portion of the control component that includes the second input device, the third input device, the divider, and the fourth input device.

10. The control component of claim 9, wherein the control component is a joystick.

11. The control component of claim 9, wherein the first input device is configured to control an operation of a display device concurrently with the control component controlling an operation of an implement of a machine.

12. The control component of claim 9, wherein the second input device is configured to control an operation of an implement of a machine, wherein the control component further comprises a fifth input device and a sixth input device, wherein the fifth input device is located below the fourth input device, and wherein the sixth input device is located below the second input device.

13. The control component of claim 9, wherein the first input device is configured to control an operation of a display device concurrently with the control component controlling an operation of at least a portion of ground engaging members of a machine.

14. The control component of claim 9, wherein the plurality of input elements are configured to control an operation of a display device concurrently with the control component controlling an operation of a machine.

15. A system, comprising:

a control component comprising:

a first portion comprising a first input device, wherein the first input device includes a plurality of input elements, a second portion comprising a second input device, a third input device, a fourth input device, and a divider, wherein a top of the first portion is below a top of the second portion, wherein the fourth input device is located below the third input device, wherein the first input device is located adjacent to a lateral side of the second input device, wherein the second input device is a vertically oriented scrolling input element located between the first input device and the third input device, wherein the third input device and the fourth input device are vertically aligned, wherein the divider is between a first portion of the vertically oriented scrolling input element and the third input device, wherein the divider is above the fourth input device and above a second portion of the vertically oriented scrolling input element, wherein the second input device is located on a first side of the divider, and where the third input device and the fourth input device are located on a second side of the divider.

16. The system of claim 15, wherein the control component is a first control component, wherein the first control component is configured to control a movement of an implement;

wherein the system further comprises a second control component that is configured to control a movement of a machine; and wherein the first input device is configured to control an operation of a display device concurrently with at least one of:

the movement of the implement controlled by the first control component, or the movement of the machine controlled by the second control component.

17. The system of claim 15, wherein the control component includes a first joystick; and wherein the system further includes a second joystick.

18. The system of claim 15, wherein the first input device is configured to control an operation of a display device of a machine concurrently with the control component controlling a movement of an implement of the machine or a movement of the machine.

19. The system of claim 15, wherein the control component is configured to control a movement of ground engaging members of a machine.

20. The system of claim 15, wherein the plurality of input elements are configured to control an operation of a display device of a machine, wherein the control component further comprises a fifth input device and a sixth input device, wherein the fifth input device is located below the fourth input device, and wherein the sixth input device is located below the second input device.

* * * * *